United States Patent
Richter

(10) Patent No.: US 6,843,457 B2
(45) Date of Patent: Jan. 18, 2005

(54) PIVOTAL CAMERA MOUNT FOR PORTABLE ELECTRONIC DEVICE

(75) Inventor: Michael Richter, Schalksmühle (DE)

(73) Assignee: Lumberg Connect GmbH & Co. KG, Schalksmuhle (DE)

( * ) Notice: Subject to any disclaimer, the term of this patent is extended or adjusted under 35 U.S.C. 154(b) by 0 days.

(21) Appl. No.: 10/642,109

(22) Filed: Aug. 14, 2003

(65) Prior Publication Data

US 2004/0061034 A1 Apr. 1, 2004

(30) Foreign Application Priority Data

Aug. 27, 2002 (DE) .......................................... 102 39 157

(51) Int. Cl.[7] .............................................. E04G 3/00
(52) U.S. Cl. .................................................. 248/274.1
(58) Field of Search ........................... 248/274.1, 299.1; 348/552, 14.02; 455/566, 575.1, 575, 90, 556, 557; 379/433.1, 433, 428.04, 428.01, 433.01, 433.06, 433.05; 396/419, 435; 74/5.6 D, 568 M, 567

(56) References Cited

U.S. PATENT DOCUMENTS 4,626,053 A     12/1986    Fayfield 5,491,507 A  *  2/1996   Umezawa et al. ........ 348/14.02
6,473,631 B1 * 10/2002   Siddoway et al. ........ 455/575.1
2001/0004584 A1 *  6/2001   Aquilar et al. ................ 455/90
2003/0109232 A1 *  6/2003   Park et al. ..................... 455/90
2004/0130644 A1 *  7/2004   Park ....................... 348/333.01

FOREIGN PATENT DOCUMENTS

DE       297 22 657      6/1998
DE       199 09 398      9/2000

* cited by examiner

Primary Examiner—Leslie A. Braun
Assistant Examiner—Kofi Schulterbrandt
(74) Attorney, Agent, or Firm—Herbert Dubno; Andrew Wilford

(57) ABSTRACT

A mounting assembly has a base, a sensor support manually pivotal about an axis on the base and carrying a sensor, a plurality of contacts on the base having axially spaced inner ends juxtaposed with the sensor support, and respective cam bumps fixed on the sensor support and engageable on pivoting of the sensor support about the axis with the contacts. The base is provided with a ring in which the sensor support is journaled. This ring is unitarily formed with the base. The support is in fact journaled in the ring of the base.

13 Claims, 2 Drawing Sheets

PIVOTAL CAMERA MOUNT FOR PORTABLE ELECTRONIC DEVICE

FIELD OF THE INVENTION

The present invention relates to a pivotal mount for a portable electronic device. More particularly this invention concerns a camera mount for a cell phone, PDA, palmtop, or laptop.

BACKGROUND OF THE INVENTION

It has become commonplace to mount a swivelable sensor in a cellphone (e.g. Motorola A820), in a palmtop, or in a notebook computer (e.g. Sony Vaio C1MHP). In the cellphone the camera is mounted at the top of the phone and can be swivelled through 180° so that it is either trained on the person using the phone or something that the phone user is facing, in which is case the electronics of the machine must flip the sensed image so that it is right side up. In the notebook it is mounted like a webcam at the top edge of the cover that incorporates the display and can also often be angled in different directions.

Although it is known for example from U.S. Pat. No. 4,626,053 of Fayfield to mount a sensor in any of a plurality of angularly offset positions on its control module, this type of permanent assembly is not usable in a cellphone, PDA, or portable computer. German published patent application 199 09 398 of Kurz describes a keyboard that can be swivelled to accommodat the user, but once again in a fairly complex system. German utility model 297 22 657 of Jessberger describes a camera module that slides into and out of a cellphone, but that cannot actually be swivelled without dismounting it.

None of these systems has the sturdiness that is desired in a mount for a pivotal sensor. Furthermore none incorporates any other function, for instance switching, that could be used when the sensor is moved to transmit information about its position to the control circuitry connected to it.

OBJECTS OF THE INVENTION

It is therefore an object of the present invention to provide an improved mounting system for a pivotal sensor.

Another object is the provision of such an improved mounting system for a pivotal sensor which overcomes the above-given disadvantages, that is which allows, for instance, a camera on a cellphone or small computer to be pivoted between different positions with automatic outputting of position information to its control circuit as it is moved.

SUMMARY OF THE INVENTION

A mounting assembly has according to the invention a base, a sensor support manually pivotal about an axis on the base and carrying a sensor, a plurality of contacts on the base having axially spaced inner ends juxtaposed with the sensor support, and respective cam bumps fixed on the sensor support and engageable on pivoting of the sensor support about the axis with the contacts.

Thus according to the invention the support for the sensor, for instance a camera, itself serves for actuating the switch contacts. They are stationary, not sliding commutator-like contacts, so that they will not wear appreciably.

According to a further feature of the invention, the base is provided with a ring in which the sensor support is journaled. This ring is unitarily formed with the base. The support is in fact journaled in the ring of the base.

The cam bumps in accordance with the invention are unitarily formed with the sensor support. Furthermore each of the contacts has an outer connection end projecting from the base. These outer ends are normally connected to circuitry carried on, for instance, a printed circuit to which the base is secured.

The contact inner ends are radially inwardly engageable with the respective cam bumps. Thus the assembly is very compact. In addition a bridge contact is provided that is engageable with both of the contact inner ends. This bridge contact extends axially between the contact inner ends and has a forked inner end with two parts each engageable with a r spective one of the contact inner ends. The switching contacts are radially elastically deflectable into and out of engagement with the bridge contact so that with two switching contacts and one bridge contact it is possible to establish four electrically differentiatable switching connections. With more than two switching contacts, even more combinations are possible. Such radially moving switching contacts are very durable and insensitive to jarring and such due to their small mass. At the same time they can open and close circuits surely and accurately, with the actuating cam only exerting a modest force on them.

According to another feature of the invention a spring is releasably retains the support relative to the base in angular positions corresponding to engagement of the bumps with the contact inner ends. To this end, the support is formed with seats in which the spring is engageable in the angular positions.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
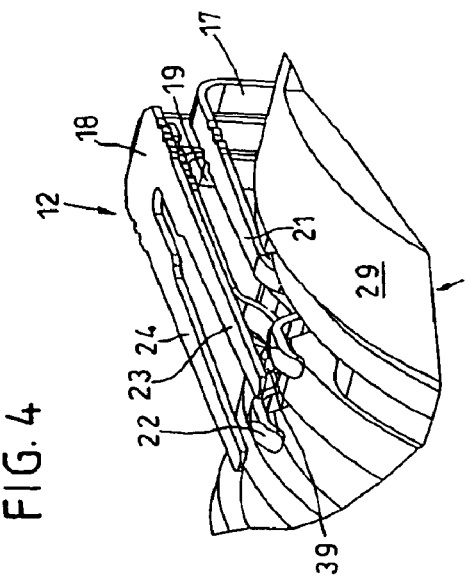
FIG. 4 is a large-scale view of a detail of FIG. 3.
Figure 3:
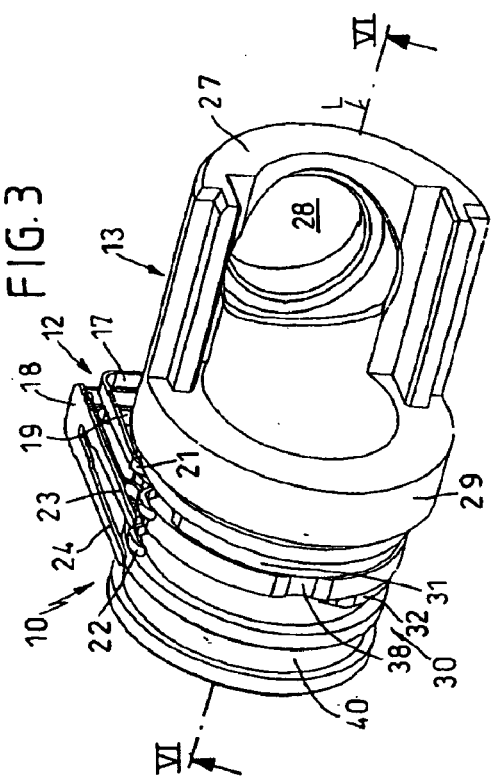
FIG. 3 is another perspective view of the mounting assembly taken from the opposite side as FIG. 1.
Figure 2:
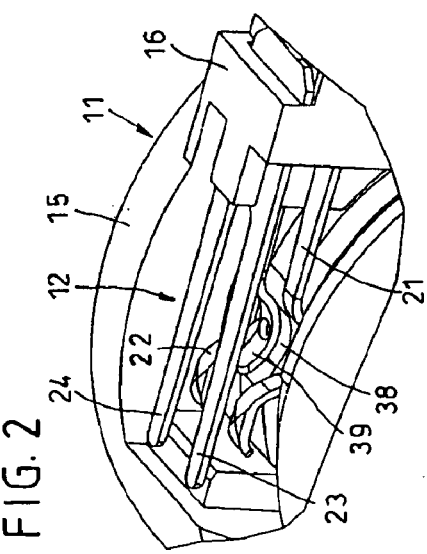
FIG. 2 is a large-scale view of a detail of FIG. 1.
Figure 1:
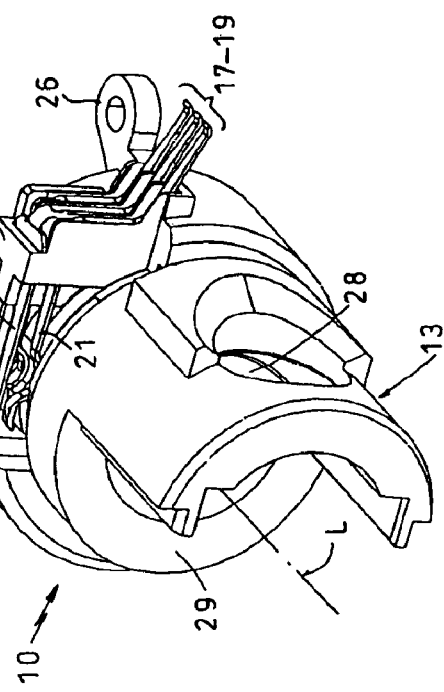
FIG. 1 is a perspective view of the mounting assembly according to the invention.
Figure 7:
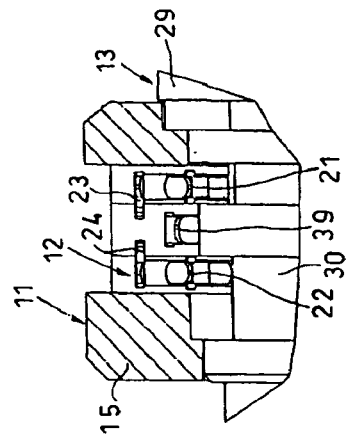
FIG. 7 is a large-scale view of a detail of FIG. 6.

As seen in the drawing, a mounting assembly 10 for a CCD sensor or camera lens 28 basically comprises a relatively stationary base 11 carrying a contact set 12 and normally fixed by an eye 26 (FIG. 1) to a stationary support such as a printed-circuit board and a sensor support 13 carrying the sensor 28 and pivotal relative to the base 11 about an axis L.

Figure 5:
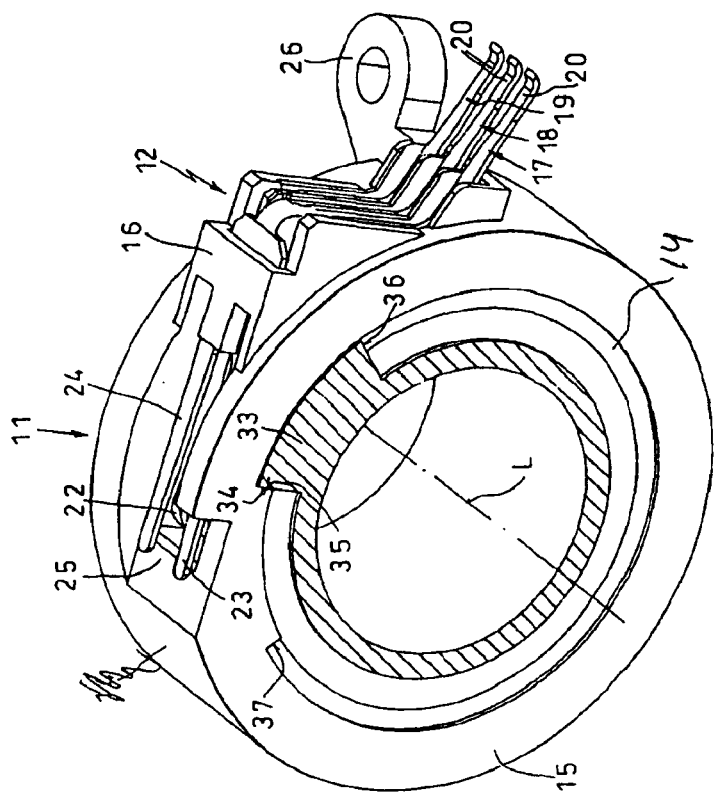
FIG. 5 is a larger-scale sectional view of the assembly.

The contact base 11 is basically formed as shown in FIG. 5 as a ring 15 centered on the axis L and having a portion 16 on which the contact set 12 is mounted. This set 12 comprises three elastically deflectable metallic contact fingers 17, 18, and 19 lying in respective planes spaced along the axis L and having outer ends 20 (FIG. 5) adapted to be soldered to or engage traces of the unillustrated circuit board to which the eye 26 is secured. The contacts 17 and 19 have inner ends 21 and 22 that extend radially inward and are intended to be elastically deflected radially. The contact 18 has a forked inner end forming terminals or contacts 23 and 24 lying radially outside and respectively engageable as described below with the contact inner ends 21 and 22.

The pivotal sensor support 13 has a semicylindrically tubular front end 27 in which the camera lens 28 is mounted and which holds unillustrated circuitry connected to this lens 28. The support 13 further has a cylindrically tubular center part 29 axially just forward of the base ring 15 and is formed therebehind with a cylindrical cam 30 carrying two axially offset cam bumps 31 and 32 respectively engageable with the inner ends 21 and 22 of th contacts 17 and 19.

Thus rotation of the support 13 can radially outwardly deflect the contacts 17 and 19 and thereby establish the following electrical connections between the contacts 17, 18, and 19:

all the contacts 17, 18, and 19 out of connection with each other;

both the contacts 17 and 19 connected to the contact 18;

the contact 17 only connected to the contact 18; and the contact 19 only connected to the contact 18.

These positions can correspond to the ON, OFF, FRONT, and BACK positions of the eye 28.

The support 13 can move through 270° relative to the base 11. This is effected by forming it as shown in FIG. 5 with a radially projecting tab 33 having end faces 34 and 36 engageable with end faces 35 and 37 of a groove 14 formed in the ring 15.

Figure 6:
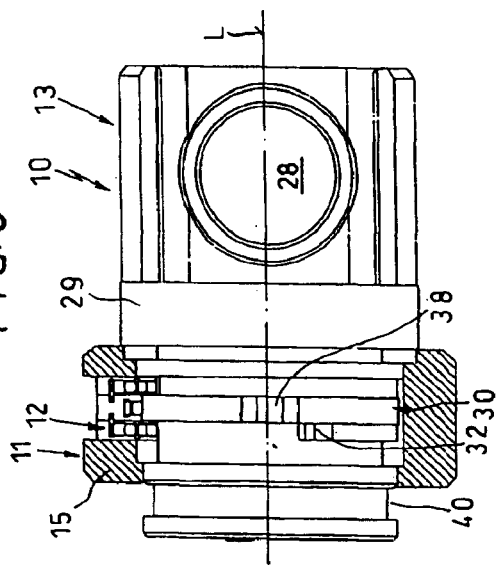
FIG. 6 is a section taken along line VI—VI of FIG. 3.

In addition the support 13 has between the cam bumps 31 and 32 a radially outwardly open recess or seat 38 (FIG. 6) which can be engaged by an inwardly biased spring 39 that stops the support 13 in the above-described positions. Of course the spring 39 merely serves to prevent inadvertent movement of the support 13 from its positions; the user can still overcome the spring 39 to turn the support 13.

A radially outwardly open groove 40 on the rearmost end of the support 13 can hold an unillustrated wavy washer that bears on the rear end of the base 11, thereby locking the support 13 axially on the base 11, as the center part 29 bears on an axial front end of the base 11.

I claim:

1. In combination with a sensor, a mounting assembly comprising:

a base;

a sensor support manually pivotal about an axis on the base and carrying the sensor;

a plurality of switch contacts on the base having axially spaced inner ends juxtaposed with the sensor support; and respective cam bumps fixed on the sensor support and engageable on pivoting of the sensor support about the axis with the contacts.

2. The mounting assembly defined in claim 1 wherein the base is provided with a ring in which the sensor support is journaled.

3. The mounting assembly defined in claim 2 wherein the ring is unitarily formed with the base.

4. The mounting assembly defined in claim 1 wherein the cam bumps are unitarily formed with the sensor support.

5. The mounting assembly defined in claim 1 wherein each of the contacts has an outer connection end projecting from the base.

6. The mounting assembly defined in claim 1 wherein the contact inner ends are radially inwardly engageable with the respective cam bumps.

7. The mounting assembly defined in claim 6, further comprising a bridge contact engageable with both of the contact inner ends.

8. The mounting assembly defined in claim 7 wherein the bridge contact extends axially between the contact inner ends.

9. The mounting assembly defined in claim 8 wherein the bridge contact has a forked inner end with two parts each engageable with a respective one of the contact inner ends.

10. The mounting assembly defined in claim 1 wherein the contacts are radially elastically deflectable.

11. The mounting assembly defined in claim 1, further comprising means including a spring for releasably retaining the support relative to the base in angular positions corresponding to engagement of the bumps with the contact inner ends.

12. The mounting assembly defined in claim 11 wherein the support is formed with seats in which the spring is engageable in the angular positions.

13. The mounting assembly defined in claim 1 wherein the sensor is a camera.

\* \* \* \* \*